Oct. 28, 1941.   E. ALLAN   2,260,286
APPARATUS FOR TREATING VEGETABLES WITH HOT WATER AND STEAM
Filed Oct. 29, 1937   3 Sheets-Sheet 1

INVENTOR
Edwin Allan
BY
Frank Kiefer
ATTORNEY

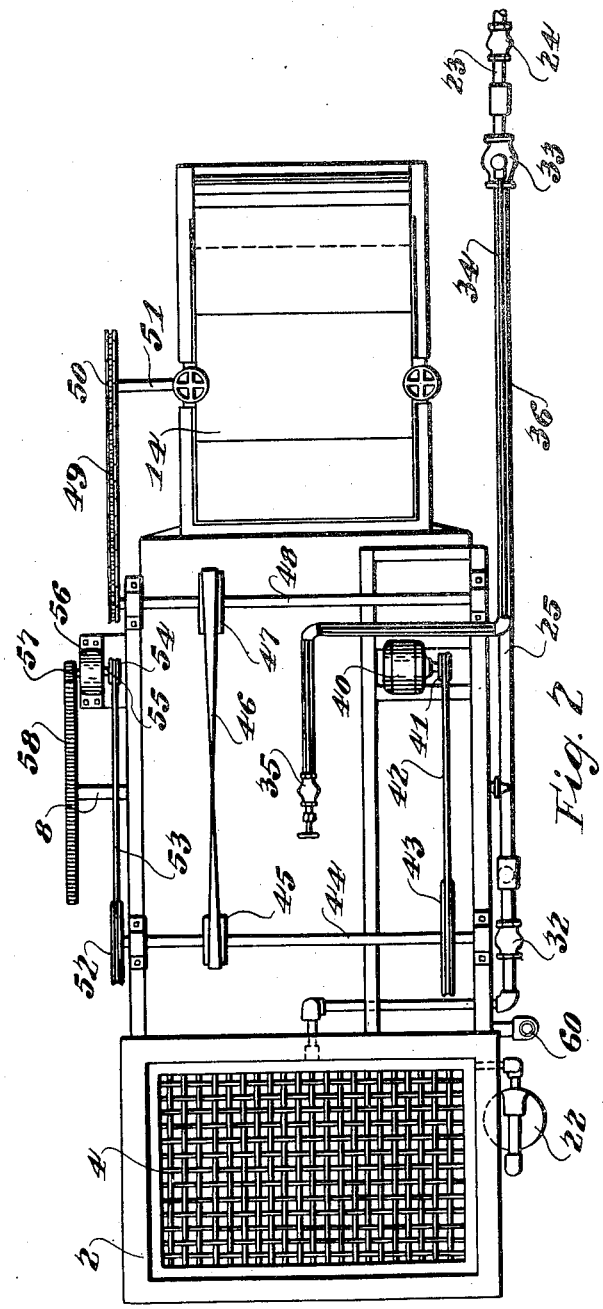

Oct. 28, 1941.  E. ALLAN  2,260,286
APPARATUS FOR TREATING VEGETABLES WITH HOT WATER AND STEAM
Filed Oct. 29, 1937  3 Sheets-Sheet 3
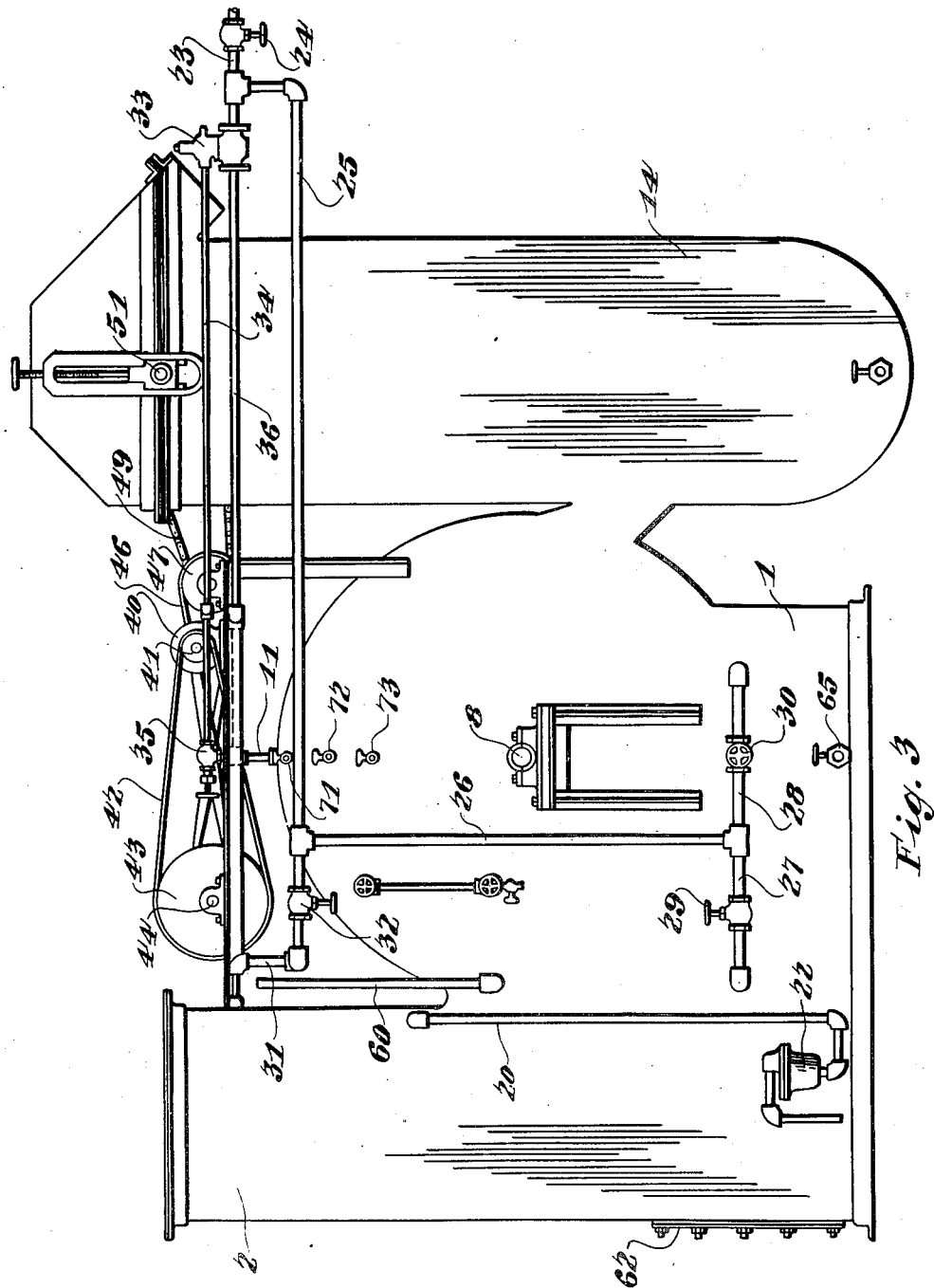
INVENTOR
Edwin Allan
BY
Frank Kirker
ATTORNEY Patented Oct. 28, 1941

2,260,286

UNITED STATES PATENT OFFICE 2,260,286

APPARATUS FOR TREATING VEGETABLES WITH HOT WATER AND STEAM

Edwin Allan, Spencerport, N. Y.

Application October 29, 1937, Serial No. 171,672

25 Claims. (Cl. 146—47)

The object of this invention is to provide a machine for scalding vegetables, more especially with reference to preparing them for the removal of the skin preparatory to canning.

Another object of the invention is to provide an apparatus that will first immerse the vegetables in boiling water and will then subject the vegetables to live steam under pressure above the atmosphere.

These and other objects of the invention will be illustrated in the drawings, described in the specification, and pointed out in the claims at the end thereof.

In the drawings:

Figure 2 is a top plan view of the apparatus.

Figure 3 is a side elevation of the apparatus, looking at it from the lower side of Figure 2.

In the drawings like reference numerals indicate like parts.

Figure 1:
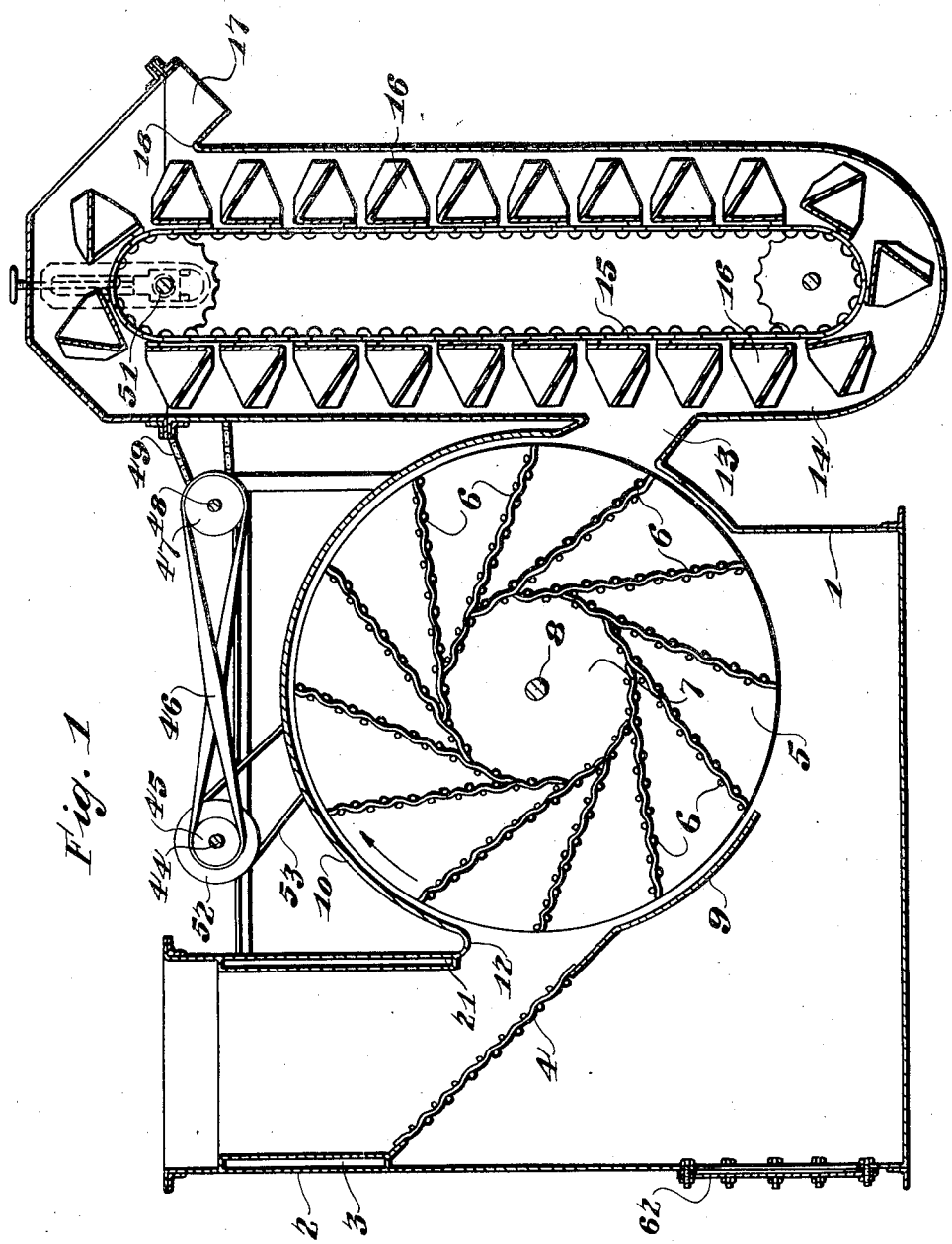
Figure 1 is a vertical section taken longitudinally through the machine, the section line being about central of Figure 2.

In the drawings reference numeral 1 indicates the casing or housing of the machine. At the upper left hand corner, as shown in Figure 1, is shown a feed hopper 2 having a steam jacket 3 surrounding it. At the bottom of this hopper is an inclined sieve 4, through which dirt can pass, but which will feed the vegetables to the revolving drum 5 shown in section in Figure 1 and allow the dirt to separate from them.

The drum 5 is a structure having two side plates of sheet steel, between which are placed tangentially twelve sieves 6, 6 etc., which form pockets or compartments between the sides of the drum. The outer end of each sieve extends to the periphery of the drum, and the inner ends of these sieves overlap each other and form a hollow compartment 7 in the center of the drum. This hollow compartment serves a useful purpose indirectly in that the bottom of each pocket raises the vegetables contained therein above the water line and holds them in contact with the live steam, as will presently be described. This drum is mounted on a shaft 8, on which it revolves slowly; namely, at from eight revolutions per hour down.

Below the drum on the feed side is placed the concave plate 9, which deflects the vegetables into the pockets and holds them there. Above the drum is placed the concave plate 10 which is water-tight with the casing and holds the water and steam under pressure.

It will be understood that the housing or tank is first filled with water at about the temperature of boiling point, and steam is then fed in through an opening in the concave plate 10 through a steam pipe 11 under pressure. The pressure of this steam forces the water down so that under the concave plate 10 it reaches the level indicated at the point 12. This causes the water to rise to the top of the feed hopper and to a corresponding level on the other side of the machine, which will now be described.

On the other side of the feed drum is a discharge opening 13, through which the vegetables are discharged from the pockets of the drum into the housing 14. In this housing is provided a chain 15 with elevator cups 16 thereon, into which the vegetables are discharged, and the vegetables are carried up by these cups through boiling water to the top, where the cups discharge them into the discharge opening 17. It will be understood that the boiling water will stand in the housing 14 on a level with the point 18.

It will also be understood that the cups 16 travel upward on the receiving side at the rate of 90 feet per minute or less.

As shown in Figure 3, a pipe 20 is provided which is connected with the steam jacket 3, through which the water of condensation is drained at about the point 21 shown in Figure 1, and is discharged into the trap 22 in the circulating system.

As shown in Figure 3, I provide a pipe line for supplying steam under pressure to the apparatus, which pipe line is indicated by the reference numeral 23 and is controlled by the valve 24. From this pipe steam passes through the pipe 25 and down through the pipe 26 into the laterals 27 and 28, through which the steam is discharged into the bottom of the tank to heat the water. The supply of steam for this purpose is controlled by the valves 29 and 30.

The pipe line 25 also feeds steam through the pipe 31 into the steam jacket 3, and this supply of steam is controlled by the valve 32. The pipe line 23 also discharges steam through the pipe 11, through the concave 10, the pressure of which steam forces the water down in the concave to the level of the point 12. The pressure of the steam in the pipe 11 is controlled by the reducing valve 33. Above the reducing valve is a small pipe line 34 that connects with the pilot valve 35, which pilot valve is connected with the pipe line 36. This pilot valve is subject to the pressure in the pipe 11 and while it does not allow the steam to pass it communicates the pressure through the pipe 34 as a back pressure to the reducing valve 33 and causes the valve 33 to close when a suitable pressure has been established under the concave plate 10. It will also be understood that the pilot valve and the reducing valve are standard equipment and are not new with me, although they constitute part of the combination which embodies my invention.

As shown in Figure 3, I provide an electric motor 40, which drives a pulley 41, which in turn drives a belt 42, and this in turn drives a pulley 43, which in turn drives a shaft 44 and a pulley 45. This drives a belt 46, which drives a pulley 47 on the shaft 48, which in turn drives a sprocket chain 49 that drives a sprocket gear 50 on the shaft 51, which drives the elevator cups.

On the shaft 44 is also a pulley 52 which drives a belt 53, which in turn drives a pulley 54 on a shaft 55, which drives a speed-reducing gear 56. This in turn drives a small pinion 57, which meshes with a large gear 58 on the shaft 8, by which the drum is turned slowly.

The operation of my machine is as follows: The tank is filled with water, air being let out through the cocks 71, 72 and 73 and the water is heated to the boiling point. At 60 an overflow pipe is connected with the inside of the tank. Water can flow up through this pipe to a suitable waste connection. Steam is then turned on through the pipe 11 until a suitable pressure of about a pound and a half is established under the concave 10. This forces the water up into the hopper 3 to about the level established by the point 18 in Figure 1. The drum and elevator cups are then started to rotating and vegetables, such as beets or carrots, etc. are fed into the hopper 2. Some or all of the dirt that is on them will be separated therefrom and will pass down through the screen 4.

These vegetables are then caught in several compartments of the drum 5 and are carried up. Any dirt that remains on them will pass down through the screen into the bottom of the tank. As the drum revolves, the vegetables are slowly lifted above the level of the boiling water and they are then exposed to the temperature of the steam which is under pressure above the water. It has been found by experience that the steam under pressure scalds the skin of the vegetables much faster than does the boiling water alone; and the steam has this additional advantage, in that it does not dilute and drain from the vegetables the juices and colors that are in them, so that the vegetables are preserved in a much better condition than if the scalding were done by the water entirely.

After being subjected to the temperature of the live steam for a suitable period, the vegetables are then discharged into the elevator cups and are carried up through boiling water, and are then discharged out through the right hand end of the machine as shown in Figure 1.

It will also be understood that the dirt that is on the vegetables will settle to the bottom of the tank shown in Figure 1, and this dirt can then be removed through the manhole 62, which is provided at the bottom of the tank for that purpose. The tank can be drained through the valve 65 preparatory to the removal of the dirt or mud through the manhole.

It will also be understood that the temperature of the water in the tank can be regulated and held at a point below the boiling point, if desired, and that the water at the top of the tank can be held at boiling point and the water below can be held at considerably lower temperature, without varying the steam pressure under the concave plate 10, all of which gives a wide range of usefulness to the machine to meet the varying conditions under which vegetables of different kinds must be treated in canning factories and elsewhere.

It is also estimated that the vegetables will first be subjected to boiling water for about three minutes, and will then be subjected to the live steam for about six minutes, and will then be discharged from the machine in about one minute more, and that the vegetables will be discharged from the machine about ten minutes from the time they are placed in the hopper.

I claim:

1. An apparatus for treating vegetables in bulk which consists of a hopper for receiving the vegetables, which hopper contains boiling water, a housing, a drum rotating in said housing, means for rotating the drum, said drum containing V-shaped pockets adapted to rotate up toward the hopper and receive the vegetables from the hopper under water and lift them out of the water, the pockets and their vegetable contents being raised above the water and being subjected to steam under pressure above the atmosphere, water seals in said housing on each side of the drum, said seals and housing being adapted to hold steam under pressure in the upper part of the drum, the pockets and their vegetable contents being submerged in boiling water thereafter on the further rotation of the drum, the vegetable contents of the pockets being discharged from the pockets under water, elevator cups adapted to receive the contents of the pockets under the boiling water, said cups being adapted to lift the vegetables out of the water and discharge them from the apparatus.

2. An apparatus for treating vegetables in bulk which consists of a hopper, a housing, a drum rotating in said housing, means for rotating the drum, said drum containing V-shaped pockets adapted to rotate up toward the hopper to receive the vegetables under water and lift them out of the water, an open space filled with live steam under pressure above the atmosphere, water seals in said housing on each side of the drum, said seals and housing being adapted to hold steam under pressure in the upper part of the drum in said open space, the pockets and their vegetable contents being carried up by the rotating drum into said open space, said rotating drum serving to submerge the pockets and their vegetable contents in boiling water thereafter.

3. An apparatus for treating vegetables which consists of a tank, a hopper for discharging vegetables into said tank, an imperforate top covering a portion of said tank, a drum having V-shaped pockets adapted to rotate up toward said hopper and rotating under said top, said drum being partly immersed in boiling water in said tank, means for admitting live steam under pressure into the space below the top and forcing the water down and out therefrom, the pockets of the drum being adapted to receive vegetables from said hopper immersed in boiling water, the drum then carrying the vegetables up into the steam space under the top in which they are subjected to live steam above atmospheric pressure, the pockets and their vegetable contents being thereafter carried under the boiling water and means for thereafter discharging the vegetables from the apparatus.

4. An apparatus for treating vegetables in bulk comprising a tank adapted to hold boiling water, a hopper at one end of the tank and elevator cups at the other end of the tank, said tank having an imperforate top covering the intermediate portion of the tank, a drum having tangential pockets separated by partitions, said drum rotating under said top up toward the hopper and being adapted to receive vegetables under water and lift them out of the water and carry them over to the elevator cups.

5. An apparatus for treating vegetables in bulk comprising a tank adapted to hold boiling water, a hopper at one end of the tank and elevator cups at the other end of the tank, said tank having an imperforate top covering the intermediate portion of the tank, a drum having tangential pockets separated by partitions, said drum rotating under said top up toward the hopper, an inclined wire screen at the bottom of the hopper over which vegetables are adapted to pass into the pockets of the drum, an open space in the tank below the stationary wire screen and the drum into which dirt from the vegetables can settle.

6. An apparatus for treating vegetables comprising a tank adapted to hold boiling water, a hopper at one end of the tank and elevator cups at the other end of the tank, said tank having an imperforate top covering the intermediate portion of the tank, a drum having tangential pockets separated by partitions, said drum rotating up toward the hopper under said top and being adapted to receive vegetables from the hopper under water and carry them up into the steam held under pressure in the top, said top being adapted to hold steam under pressure sufficient to force the water down in the top and force it up in the hopper.

7. An apparatus for treating vegetables comprising a liquid containing tank, a hopper extending into the tank at one end thereof, an endless conveyor extending into the tank at the opposite end thereof, an imperforate top covering the intermediate portion of the tank between the hopper and the conveyor, a drum having tangential pockets separated by partitions situated beneath the top, means for directing produce from the hopper to the pockets beneath the liquid level in the tank, means to direct the produce from the pockets to the endless conveyor beneath the liquid level in the tank, and means for rotating the drum in a direction to lift the produce out of the liquid adjacent the hopper and return them to the liquid adjacent the conveyor.

8. An apparatus for treating vegetables, comprising a liquid-containing tank, a liquid-containing hopper extending into the tank at one end thereof, an endless conveyor extending into the tank at the opposite end thereof, a liquid-containing housing surrounding the endless conveyor and communicating with the tank, an imperforate top covering the intermediate portion of the tank between the hopper and the conveyor, a drum having pockets separated by partitions situated beneath the imperforate top, means for directing produce from the hopper to the pockets beneath the liquid level in the tank, means to direct the produce from the pockets to the endless conveyor beneath the liquid level in the tank, and means for rotating the drum in a direction to lift the produce out of the liquid adjacent the hopper into the steam space above the liquid level and then return them to the liquid and discharge them into the housing adjacent the conveyor, means for holding live steam under pressure above the water and beneath the imperforate top.

9. An apparatus for treating vegetables, comprising a liquid-containing tank, a liquid-containing hopper extending into the tank at one end thereof, an endless conveyor extending into the tank at the opposite end thereof, a liquid-containing housing surrounding the endless conveyor and communicating with the tank, an imperforate top covering the intermediate portion of the tank between the hopper and the conveyor, a drum having pockets separated by partitions situated beneath the imperforate top, means for directing produce from the hopper to the pockets beneath the liquid level in the tank, means to direct the produce from the pockets to the endless conveyor beneath the liquid level in the tank, and means for rotating the drum in a direction to lift the produce out of the liquid adjacent the hopper and discharge them into the housing adjacent the conveyor, both the liquid-containing hopper and the liquid-containing housing for the endless conveyor extending substantially above the top of the drum, means for admitting live steam into the imperforate top over the drum, so as to force the liquid down in the top and from the pockets in the upper part of the drum and up into the hopper and into the housing of the conveyor, holding the steam in the upper part of the drum under pressure.

10. An apparatus for treating vegetables in bulk, which consists of a housing, a drum rotating therein containing V-shaped pockets, a shaft for supporting said drum, said housing being adapted to hold water above the shaft of the drum, a hopper for receiving the vegetables, which hopper is adapted to hold water, said drum on its rotation being adapted to receive vegetables from the hopper under water on one side of the housing and carry them around through about 180 degrees and carry them around to the other side of the housing, an opening on the opposite side of said housing through which the vegetables are discharged from the housing.

11. An apparatus for treating vegetables in bulk, which consists of a housing, a drum rotating therein containing V-shaped pockets, a shaft for supporting said drum, said housing being adapted to hold water above the shaft of the drum, a hopper for receiving the vegetables, which hopper is adapted to hold water and deliver the vegetables to the pockets of the drum under water, said drum on its rotation being adapted to receive vegetables from the hopper under-water on one side of the housing and carry them around through about 180 degrees to the other side of the housing, an opening on the opposite side of the housing under water through which the vegetables are discharged from the drum and the housing.

12. An apparatus for treating vegetables in bulk comprising a tank, a concave centrally located above the tank, a trunk on either side thereof and connected to the tank and concave and extending above the concave, means for admitting steam into the top of the concave to force the water down from the top of the concave and up into the trunks on either side thereof, means for conveying vegetables under water from one trunk and up into the steam in the concave, and then delivering them under water into the other trunk, and means for elevating the vegetables up above the water in the second trunk and delivering them out of the second tank.

13. An apparatus for treating vegetables in bulk comprising a tank, a central compartment having a steam space at the top thereof, a trunk extending upwardly at each end thereof, said tank and trunks and central compartment being connected at a level below the steam space for the gravity flow of water back and forth between them, each of said trunks holding water therein at the same level as the other trunk, said steam space in the central compartment being adapted to receive steam under pressure for the purpose of forcing down the water from the central compartment into the tank and forcing it up in the two trunks above the steam space, and means for conveying vegetables from the one trunk through the intermediate steam space to the other trunk.

14. An apparatus for treating vegetables in bulk comprising a central compartment having a steam space at the top thereof, an upright trunk at each end thereof, said trunks and central compartment being connected at a level below the steam space for the gravity flow of water back and forth between them, each of said trunks holding water therein at the same level as the other trunk, said steam space in the central compartment being adapted to hold water at a level below the level of the water in the trunks, said steam space being adapted to receive steam under pressure for the purpose of forcing down the water in the central compartment and forcing it up in the two trunks, means for conveying vegetables from the water of the first trunk through the water and steam space of the central compartment and into the other trunk, and means for discharging the vegetables at the top of the second trunk and above the water level common to the two trunks.

15. In an apparatus for scalding vegetables, the combination of a tank and a cover therefor adapted to hold water under pressure, water trunks on the opposite sides of the cover of said tank, each of said trunks extending above the tank and each shaft having a direct water connection with the tank on its side through which water can flow back and forth by gravity, the water under the top of said tank being sealed against the outer air by the cover of the tank and by the water in said trunks, the water in said tank being held under pressure by the water in the two shafts, a drum rotating in the tank under the cover for conveying loose vegetables from the bottom of one shaft across the tank to the bottom of the other shaft, means for conveying the vegetables up the second shaft, said vegetables being protected from the outer air from the time they are placed in the top of the first shaft and until they are delivered from the water at the top of the second shaft.

16. In an apparatus for scalding vegetables, the combination of a tank and a cover therefor adapted to hold water under pressure, water shafts on the opposite sides of the cover of said tank, each of said shafts extending above the tank and each shaft having a water connection with the tank on its side, the water under the top of said tank being sealed against the outer air by the cover of the tank and the water in said shafts, the water in said tank being held under pressure by the water in the two shafts, a drum rotating in the tank under the cover for conveying loose vegetables from the bottom of one shaft across the tank to the bottom of the other shaft, means for conveying the vegetables up the second shaft, means for subjecting the vegetables to steam under pressure while the drum is carrying them across the tank under the cover of the tank.

17. An apparatus for treating vegetables in bulk comprising a drum having pockets eccentrically arranged therein, the pockets being separated by partitions, the inner ends of said partitions ending from the axis of the drum at a distance more than one-third the radius of the drum and overlapping each other, said overlaps enclosing an open cylindrical space between them that is more than one-third the diameter of the drum, a tank in which said drum is mounted to rotate on a horizontal axis, said tank having a delivery chute on one side of the drum for discharging vegetables into the pockets of the drum by gravity under water and having a receiving chute on the other side of the drum into which the vegetables are discharged under water by gravity from the pockets of the drum and means for rotating said drum.

18. An apparatus for treating vegetables in bulk comprising a drum having pockets eccentrically arranged therein, the pockets being separated by partitions, the inner ends of said partitions ending from the axis of the drum at a distance more than one-third the radius of the drum and overlapping each other, said overlaps enclosing an open cylindrical space between them that is more than one-third the diameter of the drum, a housing adapted to hold water in which said drum is mounted to rotate, a shaft on which said drum is mounted to rotate, said housing having a water line above the shaft and below the top of the open cylindrical space, a chute adapted to deliver vegetables to the pockets of the drum under water, means to rotate the drum, said drum being adapted to receive vegetables in the pockets on one side below the water line and raise them above the water line, and then carry them below the same water line on the other side of the drum and discharge them from the pockets.

19. A housing for a vegetable scalding apparatus, comprising a tank adapted to hold water, a concave cover for the intermediate part thereof adapted to hold steam under pressure and means to introduce steam under said intermediate cover under pressure, a trunk on one side of the intermediate cover connected to the tank and one edge of the concave and extending above the cover, another trunk on the other side of the cover connected to the tank and extending above the cover and connected to the other edge of the concave, each trunk having a water tight connection with its side of the tank and sealed against the outer air, whereby the water in the tank is put under pressure by the water in the two trunks, means for conveying loose vegetables from the bottom of one trunk and across the tank and up the other trunk, and subjecting them to steam under pressure while passing across the intermediate part of the tank under the cover.

20. In an apparatus for treating vegetables in bulk, a tank, a concave located centrally above the tank, a trunk on one side thereof extending above the concave and discharging into the tank below the concave, a trunk on the other side thereof connected to the tank below the concave and extending above the concave, said trunks being located on opposite sides of the axis of the concave and connected adjacent to the lower edges of the concave, all of said elements being open to the tank and being joined together to hold water therein, means for admitting steam into the top of the concave and forcing the water down from the top of the concave into the tank and up into the trunks on either side thereof, the water in the trunks and tank acting as a seal on the concave and holding the steam therein under pressure, means for moving the vegetables from one trunk through the steam in the concave and discharging them into the other trunk.

21. In an apparatus for treating vegetables in bulk, a tank, a concave located centrally above the tank, a trunk on one side thereof extending above the concave and discharging into the tank below the concave, a trunk on the other side thereof connected to the tank below the concave and extending above the concave, said trunks being located on opposite sides of the axis of the concave and connected adjacent to the lower edges of the concave, all of said elements being open to the tank and being joined together to hold water therein, means for admitting steam into the top of the concave and forcing the water down from the top of the concave into the tank and up into the trunks on either side thereof, the water in the trunks and tank acting as a seal on the concave and holding the steam therein under pressure, means for conveying the vegetables under water from the first trunk up into the steam under pressure in the concave, and then delivering them into the same tank and into the other trunk near the bottom thereof, and means for elevating the vegetables up above the water in the second trunk and delivering them out of the second trunk.

22. An apparatus for treating vegetables in bulk, comprising a tank, a concave located centrally above the tank, a trunk on either side of the concave extending above the concave, and connected to the concave at the lower edges of the concave, all of said elements being joined together to hold water therein, means for admitting steam into the top of the concave to force the water down from the top of the concave and up into the trunks on either side thereof, the water in the trunks and tank acting as a seal on the concave and holding the steam therein under pressure, means for conveying vegetables under water from one trunk up into the steam under pressure in the concave, and then delivering them under water into the same tank and into the other trunk, and means for elevating the vegetables up above the water in the second trunk and delivering them out of the second trunk, said trunks being located on opposite sides of the axis of the concave.

23. An apparatus for treating vegetables, comprising a liquid-containing tank, a liquid-containing hopper extending into the tank at one end thereof, an endless conveyor extending upwardly into the tank at the opposite end thereof, a liquid-containing housing surrounding the endless conveyor and communicating with the tank, an imperforate concave top covering the intermediate portion of the tank between the hopper and the conveyor, means to force steam under pressure into the concave to force the water out of the concave and into the trunks, a drum having pockets separated by partitions situated beneath the concave top, means for directing vegetables from the hopper to the pockets beneath the liquid level in the tank, means to direct the vegetables from the pockets to the endless conveyor beneath the liquid level in the tank, and means for rotating the drum in a direction to lift the vegetables out of the liquid adjacent the hopper and discharge them into the housing adjacent the conveyor.

24. An apparatus for treating vegetables, comprising a liquid-containing tank, a liquid-containing hopper extending into the tank at one end thereof, an endless conveyor extending into the tank at the opposite end thereof, a liquid-containing housing surrounding the endless conveyor and communicating with the tank, an imperforate top covering the intermediate portion of the tank between the hopper and the conveyor and extending above the connections between them, a drum having pockets separated by partitions situated beneath the concave top, means for directing vegetables from the hopper to the pockets beneath the liquid level in the tank, means to direct the vegetables from the pockets to the endless conveyor beneath the liquid level in the tank, and means for rotating the drum in a direction to lift the vegetables out of the liquid adjacent the hopper and discharge them into the housing adjacent the conveyor, both the liquid-containing hopper and the liquid-containing housing for the endless conveyor extending substantially above the top of the drum, means for admitting live steam into the imperforate top over the drum, so as to force the liquid down in the top and out of the pockets in the upper part of the drum and up into the hopper and into the housing of the conveyor, holding the steam in the upper part of the drum under pressure.

25. An apparatus for treating vegetables in bulk comprising a tank with a water column at each end thereof connected with said tank, said water columns and tank being filled normally with hot water, a steam chamber located between the water columns and over the tank, in which chamber steam is held under pressure by the height of the water in the water columns, said columns and tank and steam chamber being so connected that water can flow from either water column into the other column and so that water normally stands at the same level in the two columns, one of said water columns being open at the top and being adapted to receive vegetables therein and permit them to pass down therein, means for conveying vegetables from the bottom of said water column up out of the water and into the steam in the steam chamber, and then carry them down into the water again and discharge them into the other water column, up through which they can move to the top of the water.

EDWIN ALLAN.